April 30, 1968 V. N. ALFEEV 3,381,225

UHF SELECTIVE RADIO RECEIVING SYSTEM WITH MAXIMUM POSSIBLE SENSITIVITY

Filed Oct. 2, 1963 5 Sheets-Sheet 1

April 30, 1968 V. N. ALFEEV 3,381,225

UHF SELECTIVE RADIO RECEIVING SYSTEM WITH MAXIMUM POSSIBLE SENSITIVITY

Filed Oct. 2, 1963 5 Sheets-Sheet 4

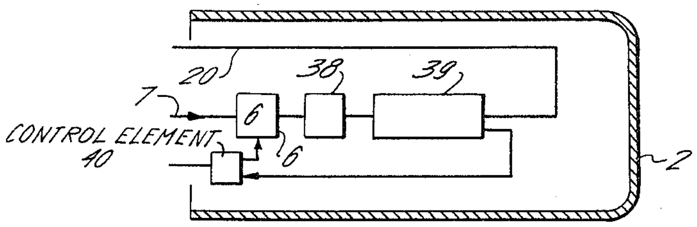
FIG. 10
FIG. 11
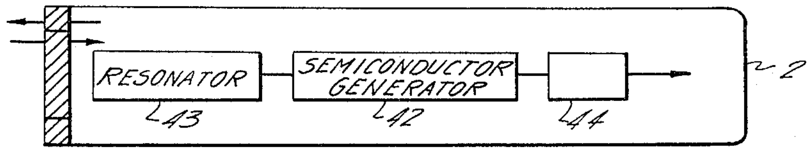
FIG. 12 FIG. 13 FIG. 14
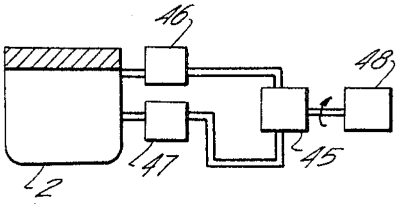
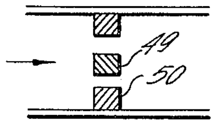
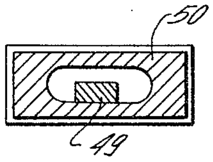
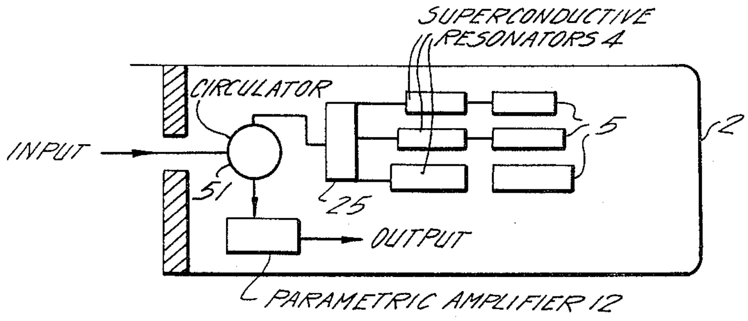
FIG. 15

United States Patent Office 3,381,225
Patented Apr. 30, 1968

3,381,225
UHF SELECTIVE RADIO RECEIVING SYSTEM WITH MAXIMUM POSSIBLE SENSITIVITY
Vladimir Nikolaevich Alfeev, Universitetsky Prospect 5, Apt. 55, Moscow, U.S.S.R.
Filed Oct. 2, 1963, Ser. No. 313,300
20 Claims. (Cl. 325—445)

The present invention relates to superhigh frequency signal reception systems in radioastronomy and global communication systems employing satellites, radiolocation, and tropospheric and radio-relay communications and more specifically to superhigh sensitive, highly stabilized and selective reception systems for superhigh frequency signals.

Quantum (parametric) amplifiers, the noise temperature of which may reach several degrees Kelvin, as well as parametric amplifiers with noise temperatures up to hundreds of absolute degrees are already known. However, no substantial improvements have been achieved either in the characteristics or in the properties of superhigh sensitive receiving systems serving various purposes and suitable for high-quality reception of wide-band signals representing information.

The circuit designs of the superhigh sensitive receiving devices known in the art do not solve the above-mentioned problem. Even the unique receiving systems of various countries possess characteristics which do not satisfy international standards for high-quality devices, serving to receive multichannel television information and their sensitivity (dozens of absolute degrees) is many times lower than that of quantum amplifiers the nominal noise temperature of which, determined by the spontaneous molecular emission of the paramagnetic substances may be only one or two absolute degrees.

The size, weight, power consumption and cost even of such reception systems with sufficient quality are so great that hitherto there was no practical possibility of their commercial manufacture and wide utilization.

Poor sensitivity of modern receivers, as compared with that of the components installed in them is due to the fact that the super-high-quality input channels (input filters, ferrites, parts of connecting lines etc.) from the primary radiation to the receiver input, as well as ferrite rectifiers, travelling-wave tubes, mixers, intermediate-frequency amplifiers, etc., switched in after the low-noise amplifiers, inevitably have high noise levels.

Besides, it is evident, that unless the superhigh sensitive receiving systems meet the international standard requirements for multi-channel radio lines concerning their transmission bandwidth (dozens of megacycles with given electrical parameters of the transmission band, and unless they have a high degree of selectivity with respect to the noise signals received by the antenna, operation stability, etc., they will not come into common use. Supersensitivity (low noise temperature) cannot be provided alone, without the above-mentioned conditions.

A number of principal disadvantages, characteristic of the above-mentioned devices, such as amplification instability due to the regenerative properties of amplifiers (quantum and parametric) which are most suitable for operation; narrow bandwidth (of the order of fractions or units of megacycles for resonance quantum amplifiers); burn-out of superhigh frequency semiconductor devices (e.g. parametric diodes) due to powerful signals arriving at the input of the receiver; great irregularity of the amplitude and phase characteristics within the transmission band, which cannot be tolerated when receiving multichannel and high-quality television information; moisture, temperature, and pressure dependence of the parameters; large size, weight, power consumption etc., preclude the possibility of the sensitive receivers acquiring the necessary qualities and wide use of the new devices (quantum and parametric) in commercial radio equipment designed for various purposes.

The previous attempts made to overcome these difficulties and disadvantages have shown no positive results.

As a result of scientific research and experimental work the applicant has successfully solved the above described problem and has achieved its practical realization.

There is proposed a new principle for the design of superhigh sensitive radio receiving systems and new circuit designs which would provide full realization of all the achievements of modern radio technique and physics with small investments for finishing and commercially manufacturing these devices for specific operating frequencies and parameters. All the above-mentioned drawbacks would be eliminated.

The proposed radio receiving system can be completely standardized; and by adding or eliminating separate parts (units), leading to some changes in its size, weight and power consumption, in view of specific purposes, can operate in the following modes.

(1) *Superhigh sensitive mode*

This mode permits obtaining the maximum sensitivity, possible in the radio art, which corresponds to a noise temperature of about two degrees absolute, measured at the antenna. The sensitivity of the whole system is determined only by the noises of the Earth and space resulting from the antenna construction. The rest of the parameters (transmission band, irregularity of the band characteristics, selectivity, stability etc.) fully correspond to international standards.

Power consumption in this mode of operation may reach several kilowatts; the size of the system remain unchanged.

(2) *High sensitivity mode*

In this mode the noise temperature (measured at the antenna) reaches 10 to 15 degrees absolute with high quality in the other parameters. Power consumption for some devices may be up to 1–3 kilowatts and less; the size of the receiving system is the same; the size and weight of the auxiliary devices are reduced approximately by two fold.

(3) *Simplified mode*

In this mode the noise temperature of the antenna reaches 30 to 50 degrees absolute with high quality of the other parameters. The size and weight of the receiving system and of the auxiliary devices will be two or three times reduced, and it can be installed in the usual cabinet of a commercial television set, including the power supply devices.

The proposed receiving system can operate with any input of the antenna (waveguide or coaxial) and any output.

In principle the proposed receiving device does not need specially fabricated parts. It can be produced on a commercial scale with the use of standard parts industrially available in Russia, in the United States, in Great Britain, Japan and other countries. At the same time it is simple and reliable in design, and small in size and weight.

Approximate cost in case of its commercial manufacture for operating in the third mode will not be higher than the cost of a first class television set, while the cost of similar receiving systems, possessing good parameters reaches hundreds of thousand dollars.

The cost of the receivers with an additional set of components, permitting operation in the first and second modes, in case of their commercial manufacture, will be only somewhat higher than the cost of a first class television set.

The most valuable feature of the proposed receiving system is the possibility of connecting it to the input of a conventional commercial television set, when it is necessary to effect reception of high-quality television transmissions at any point however remote from the radio-relay lines. For example, television transmission to the United States or to Europe from Japan.

The proposed system, if necessary, permits simultaneous operation with the use of the same antenna of one ultra-high frequency (UHF) transmitter or several receivers without any deterioration of the receiver parameters.

The heterodyne frequency stability (of the order of $10^{-9}$) of the receiver of the invention is by some orders of magnitude higher than that of heterodyne components used in receiving systems of the same class. Besides, the system of the instant invention may be designed with possible automatic retuning to various frequencies.

Thus an object of the present invention is to provide a super high sensitive, selective radio receiving ultra-high frequency system comprising low noise quantum or parametric amplifiers, multiresonator filters, ferrite devices, mixers and other devices with the required selectivity which has wide transmission bandwidth of the whole system, and has minimum irregularity of the characteristics (e.g., level of cooling temperature, time alteration limits, and inside pressure within the cooling devices of the said system within this band of stability of the main parameters of the system.

Another object of the invention is also to make possible the utilization of standard television sets for direct reception of high-quality television transmissions, relayed from artificial Earth's satellites, without costly and cumbersome radio-relay lines.

Further objects of the invention are to provide reception with one antenna of several multichannel television channels, separated in frequencies, without diminishing their sensitivity, and also simultaneous operation of the transmitter and superhigh sensitive receivers with one antenna without diminishing the senstivity of the latter.

Among other objects of the invention there should be noted the provision of apparatus having the possibility of eliminating losses in multiresonator filters, splitters (branded-guide couplers), and of reducing power consumption of the proposed system, the possibility of automatic protection from input semiconductor burnout, for instance parametric or mixing diodes, due to the presence of powerful parasitic signals that can come from the antenna, as well as automatic retuning of the receiving system to various input signals.

The superhigh sensitive selective radio receiving ultra-high frequency system according to the present invention comprises a system employing a cryostat for maintaining the necessary parameters at ultra-low temperatures, amplifiers with low noise level, devices for selective reception of signals, a mixing high frequency device connected to said amplifiers, heterodyning devices and pumping generators disposed outside the cryostat and connected to said mixing high frequency devices and amplifiers. Means are provided for the stable operation of the heterodyning devices and pumping generators. Means are also provided for matching the parts of the system and for separating the input and output signals; the means for connecting the parts of the system being assembled and disposed in said cryostat.

It is understood that various modifications in the shown embodiment of the invention disclosed herein may be made which satisfy the objects of the invention without departing from the spirit of the invention as defined in the claims.

Other objects and advantages of the invention will become apparent from the following detailed description with due reference to the accompanying drawings, in which:

FIG. 10 shows a block diagram of the receiving system with the protection of the semiconductor diode of the low-noise amplifier by means of a paramagnetic substance disposed at the input of the system;

FIG. 11 shows a block diagram of a cooled heterodyne, employing semiconductors (diodes, transistors);

FIG. 12 shows a block diagram for coupling the compressor of a closed cycle unit (wherein the vaporized liquid is recompressed and fed back to the cryostat), the cryostat being a part thereof, to the shaft of the electric drive of the supply devices;

FIG. 13 shows in diagrammatic form the installation of the active element (paramagnetic substance, parametric or tunnel diode) of the low-noise amplifier to a resonance diaphragm;

FIG. 14 shows the cross-section of the resonance membrane with the active element in accordance with FIG. 13; and FIG. 15 shows a block diagram of the system for reception of a given number of signals employing a quantum amplifiers operating "on reflection" with the ferrite circulator.

Figure 1:
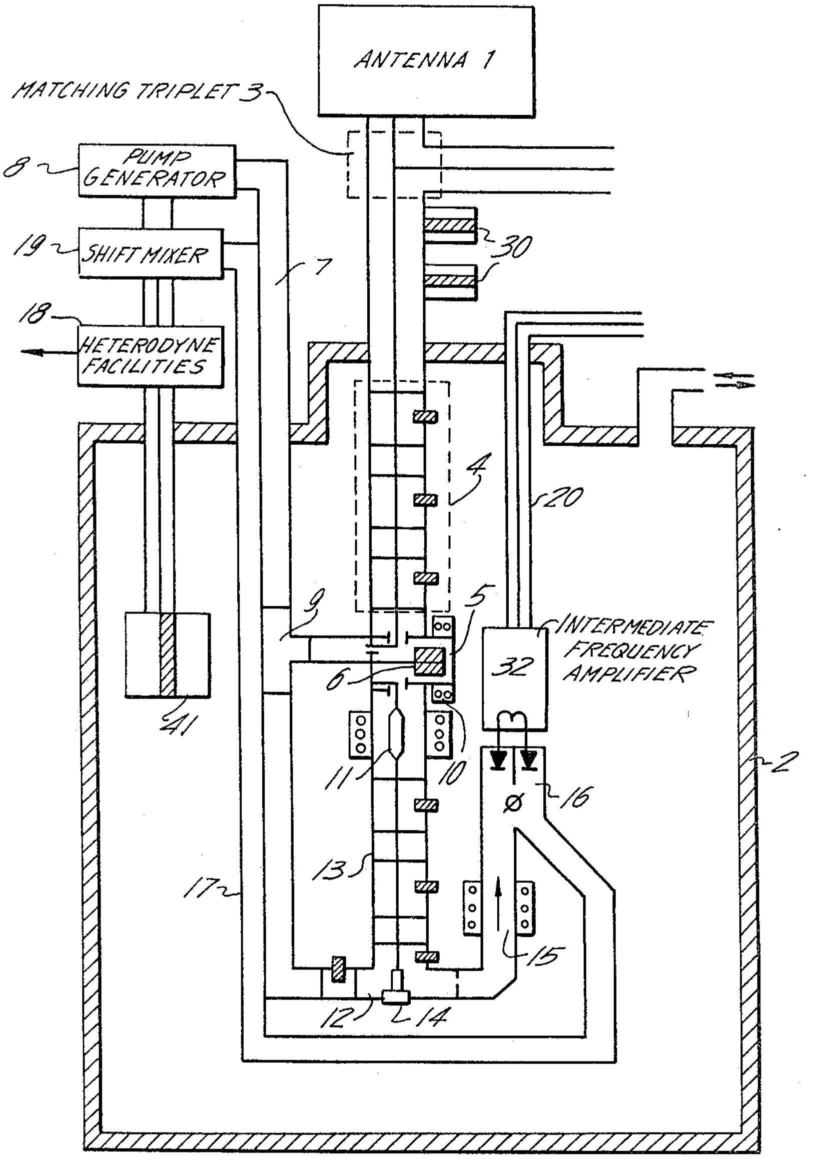
FIG. 1 shows a block diagram of one of the embodiments of the ultra-high frequency receiving system in accordance with the invention.

A detailed description of some of the embodiments of the invention is given below for a better understanding thereof by those skilled in the art; the general diagram of the invention is given in FIG. 1.

The proposed system and its units operate as follows:

The received UHF (ultra-high frequency) signal (at a frequency $fc$) from the antenna emitter 1 is fed to the input of the cooled receiving system disposed inside the cryostat 2, through three element coupler 3 serving to couple the transmitter tuned to the frequency $f_{trans}$ to the antenna. Passing through the super-conductive resonators 4, providing the input channel selectivity and the required frequency from the received signal, the signal power is fed to the resonator 5, which forms a paramagnetic amplifier or a part of a line with a paramagnetic crystal 6. See the following publications: (a) Troup G. "Masers," London, 1959, (b) Singer I. R. "Masers," New York, 1959. These publications deal with the operation of paramagnetic crystals, performing amplification which is based, as a rule, on the utilization of substances possessing three energy levels. The pumping power, required for the stable amplification of the input signal is supplied through the guide 7 from the pumping generator 8 via three element coupler 9 to the resonator 5 (part of the transmitting line). The necessary magnetic field is created by an electromagnet with a super-conductive winding 10.

The received signal, after being amplified in the quantum (paramagnetic) amplifier 5, is fed via the cooled ferrite isolator 11 to the input of the multi-circuit parametric amplifier 12. The signal passes through its input circuits 13 which provide the selectivity and amplifier frequency characteristics within the transmission band to the parametric diode 14. For the expression "ferrite isolator" see the works of the following authors: (a) Lax B., Button K., J. Appl. Phys., 1955 v. 26, No. 9, p. 1184; (b) Fox A. G. and others., BSTJ, 1955 v. 34, No. I, p. 5; (c) Michaelyan A. L. Theory and Application of Ferrites for Ultra-High Frequencies, Gosenergoizdat Publication, Moscow, 1963. The isolator lets ultra-high frequency energy through without losses in one direction and absorbs it during propagation in reverse direction.

The pumping power is supplied to the parametric diode 14 through the three element coupler 9 from the pumping generator 8 of the quantum amplifier 5. The amplifier output operates in the signal frequency change mode (for instance into the difference frequency) being coupled to the cooled mixer 16 through the cooled ferrite valve 15.

During the operation of the quantum and parametric amplifiers in "reflecting mode" their input resonators are connected to the cooled ferrite circulator which separates the input and output (amplified) signals.

The heterodyne frequency power, differing in frequency from that of the signal coming to the mixer input by the intermediate frequency, is supplied by the guide 17 from a separate heterodyne 18 or, as it is shown in FIG. 1, from a shift mixer 19 where this power is created by the voltage of the pumping generator 8 and the heterodyne 18 feeding the mixer 19. The shift mixer serves to eliminate the frequency instability of a pumping generator during the operation of the parametric amplifier-converter, the result being a converted frequency signal output, for instance $f^{-}$. As a rule this mixer is fed by the voltage of the pumping generator and heterodyne which equals $F_T=f_C\mp F_\pi$, where $F_\pi$ is the intermediate frequency of the receiver.

From the mixer output the signal, transformed to an intermediate frequency, is fed to guide 20 from which it leaves cryostat 2.

Figure 2:
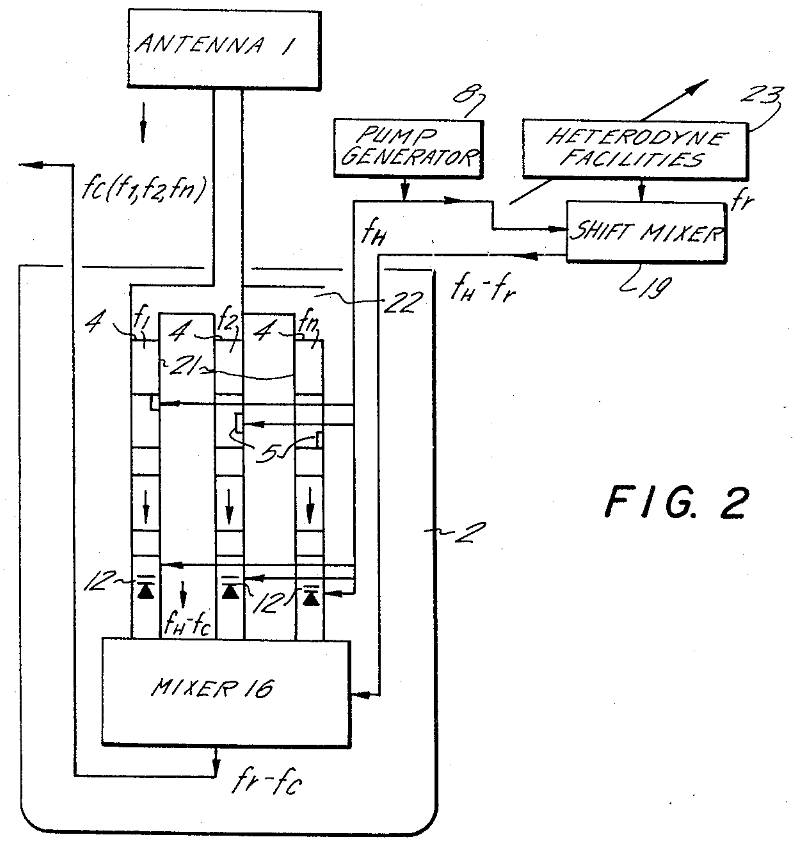
FIG. 2 shows a block diagram of the ultra-high frequency receiving system with the automatic retuning to various signals.

The described receiving system provided with automatic returning to various signals, is shown in FIG. 2 wherein the same reference characters are used for the same elements of FIG. 1. The system comprises several signal guides 21 (waveguides or coaxial lines) with low-noise (quantum, parametric or the like) multiresonator amplifiers (5) and (12) in each signal guide, tuned to the corresponding reception frequencies and connected by the multiple coupler 22 in a single cooled construction, provided with a single input from the antenna emitter 1. In case the system operates with a double circuit parametric amplifier 12, shown by way of illustration in FIG. 3, the receiver mixer 16 after the shift mixer 19 is supplied with a heterodyne frequency voltage, which frequency is changed by means of retunable heterodyner 23 disposed in the required place, and tuned in such a way, that the I.F., when shifting from one frequency to the other, should remain stable and correpsond to the frequency of the I.F. stable amplifier.

The double-circle parametric amplifier is a circuit in which the diode is simultaneously connected to the circuit possessing the input signal frequency $f_C$ and to the circuit possessing an "auxiliary" frequency, for example $f=f_H-f_C$ where $f_H$ is the pumping generator frequency. This amplifier is referred as 12 in FIG. 1.

Figure 3:
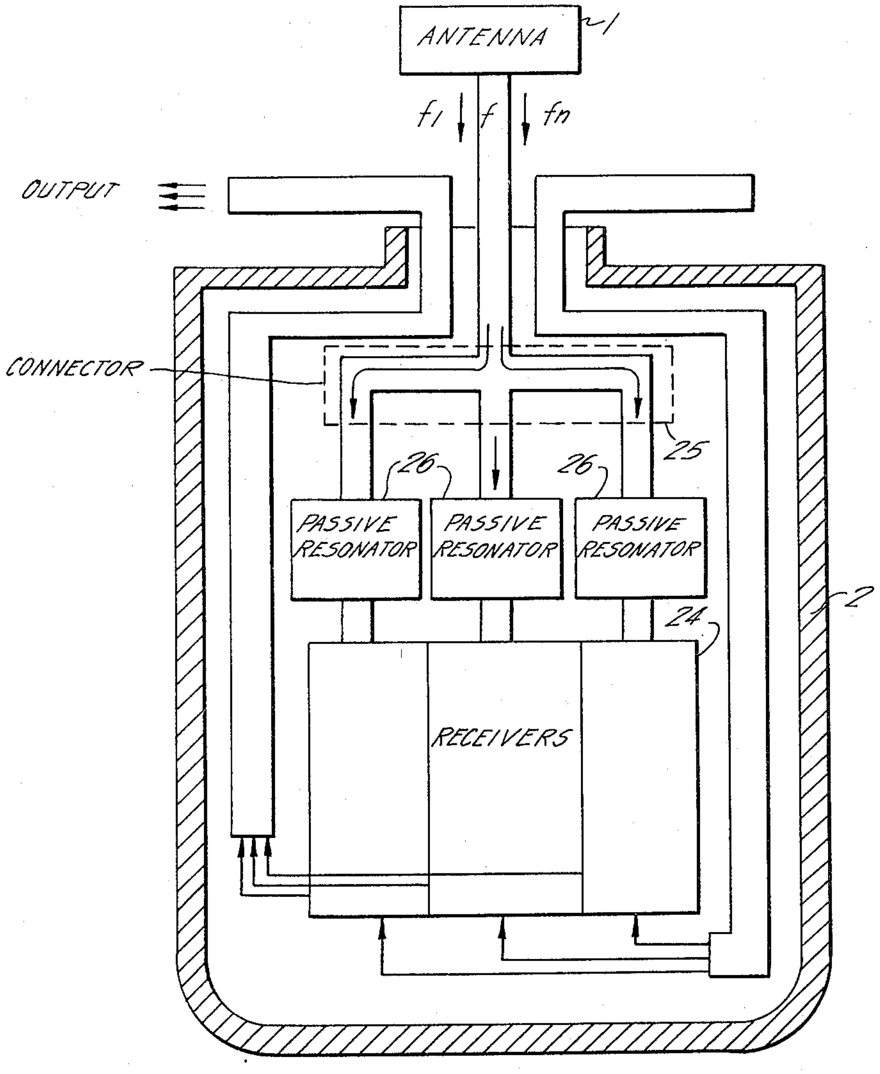
FIG. 3 shows a main block diagram of the ultra-high frequency receiving system providing multichannel operation of several receivers with one antenna.

In FIG. 3 it may appear under number 26, where the parametric amplifier serves as the first cascade, or it may be 24 when the said amplifier serves as the second cascade.

FIG. 3 shows the circuit of the superhigh sensitive receiving system providing simultaneous reception of several channels, with various frequencies (multichannel operation) from a single antenna.

The several (n) superhigh sensitive receivers 24 operate simultaneously, each receives frequency signals of one channel and is joined by the coupler 25 with "n" shoulders. The electric lengths of the shoulders up to the first filter channel resonators 26, are chosen so as to compensate for their mutual shunting. They, together with the channel coupler 25 and their filters 26 are disposed in a single cryostat 2. The input shoulder of the cooled coupler 25 leading out of the cryostat 2 is connected to the antenna emitter 1.

Figure 4:
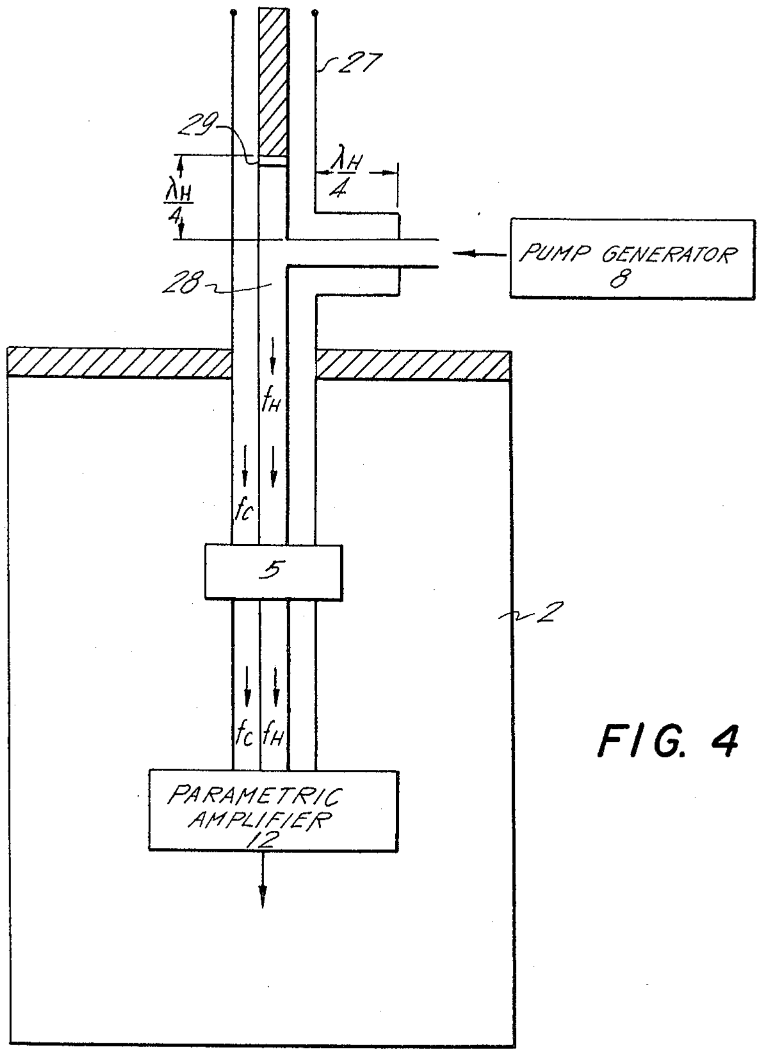
FIG. 4 shows a main block diagram of ultra-high frequency receiving system operating without a separate pumping channel for its low-noise amplifiers.

FIG. 4 shows the diagram of a miniaturized embodiment of the proposed receiving system. As it is clear from FIG. 4, the system comprises a rigid coaxial guide 27, the inner conductor 28 of which serves as a pumping waveguide for the quantum amplifier 5, and parametric amplifier 12. The "p–n" junction activation of the parametric amplifier and the paramagnetic substance of the quantum amplifier is performed through the elements connecting the inner conductor 28, which serves as a pumping waveguide and the internal cavity of the coaxial line 27 serving as a signal channel. The pumping generator 8 is connected to the central conductor of the coaxial line 27 by a quarter wavelength line disposed outside the cryostat 2 and shorted at its end with an open input to the inner part of the central conductor 28. The pumping input being performed therethrough, while in the central conductor 28 the emitter partition 29 is disposed from the input by a distance of one quarter of the pumping wavelength.

The various designs of the system, the general scheme of which is shown in FIG. 1, have several possible embodiments. For instance the input portion (up to the low noise amplifier) is disposed outside the cryostat of said system; the quantum (ferrite) amplifier is coupled to the parametric (tunnel) amplifier within one cryostat, the rest of the elements of the system being disposed outside the cryostat; the input part and amplifiers are disposed inside the cryostat and the stages switched in after the amplifiers (mixing devices, etc.) are outside the cryostat; one of the amplifiers (for instance, the quantum amplifier) is disposed in a helium cryostat and the other amplifier (for instance the parametric amplifier) is within a cryostat of another temperature (for instance that of liquid nitrogen). In this case a TW (traveling wave) tube may be used as one of the low-noise amplifiers.

To obtain the necessary form of the characteristic, the receiving channel selectivity and the necessary transmission bandwith of the quantum (ferrite) parametric (tunnel) amplifiers, the loaded qualities of the resonators (4 and 13 in FIG. 1) of the filter, in which the cooled active substances of said amplifiers are disposed, are chosen respectively at the expense of the connecting elements. The amplification factor K and the form of the frequency characteristics of such a multiresonator system are defined by at matrix method according to the following formulas:

(a) for the straight mode $$K=\frac{4y_0^2}{(A_{21})_2}$$

(b) for the reflecting mode $$K=\left|\frac{y_0-A_{21}/A_{11}}{y_0+A_{21}/A_{11}}\right|^2$$

where $A_{21}$ and $A_{11}$ are coefficients of the matrix of a circuit made of resonators, filled fully or partially with an active substance (paramagnetic substance, parametric diodes, etc.);

$y_0$ is wave conductance.

For a low noise system comprising "n" resonators connected either directly or through sections of a line having a length of a quarter wavelength, we have $$K=\frac{(1+\alpha)^2+P(Q_oQ_n)^{2n}}{(1-\alpha)^2+\varphi(Q_oQ_n\zeta)^{2n}}$$

where:

$\alpha$ is a regenerative parameter
$P(Q_oQ_n)^{2n}$ is a function of internal and loaded qualities;
$\varphi(Q_oQ_n\alpha\zeta)^{2n}$ is a function, describing the frequency characteristics of a low-noise amplifier with "$n$" resonators. The transmission bandwith is determined according to the formula:

$$\pi=\sqrt[n]{\frac{1-\alpha}{Q!}}$$

The calculation of the system is done in the following way on the basis of the product of "$n$" matrices of separate resonators each or some of them, containing an active substance:

$$\begin{vmatrix}A_{11}A_{12}\\A_{21}A_{22}\end{vmatrix}=\begin{vmatrix}a^1{}_{11}a^1{}_{12}\\a^1{}_{21}a^1{}_{22}\end{vmatrix}\begin{vmatrix}a^2{}_{11}a^2{}_{12}\\a^2{}_{21}a^2{}_{22}\end{vmatrix}\cdots\cdots\begin{vmatrix}a^n{}_{11}a^n{}_{12}\\a^n{}_{21}a^n{}_{22}\end{vmatrix}$$

Thus, for a three-circuit low-noise amplifier this equation is of the form:

$$\begin{vmatrix}-1-\frac{y_2y_3}{y_o^2} & -\frac{y_2}{y_o^2}\\ -y_1-y_3-\frac{y_1y_2y_3}{y_o^2} & -1-\frac{y_1y_1}{y_o^2}\end{vmatrix}$$

Here K approximately equals:

$$K=4y_o\frac{R_e(A_{21}A_{11})}{(y_oA_{11}+A_{21})^2}$$

To supply the low-noise amplifiers with the minimum possible power from the pumping generators and for switching out the pumping of the quantum amplifier in case the input signal exceeds a definite level, the pumping channel is provided with necessary cooled elements which ensure the operation of the low-noise amplifiers far from the generation threshold, as well as absorption of the power of the input signal in case of its increase, thus safeguarding the diodes of the subsequent stages.

Splitting and decoupling of the pumping energy for its application to both low-noise amplifiers is effected by a three element coupler 9 (FIG. 1) provided with splitting elements and disposed within the same cryostat. The auxiliary frequency circuit of the parametric amplifier 12 (FIG. 1) is tuned to the frequency of the quantum amplifier pumping generator and to the input signal frequency.

The construction of the receiving system, providing for its simultaneous operation employing one antenna with a receiver tuned to a different frequency comprises (FIG. 1) branching filters 30 (FIG. 1), and resonators 4 (FIG. 2) disposed together with the input channel of the low-noise amplifiers of said system within the same cryostat. Paramagnetic substance 6 (or ferrite) is chosen so that their spectrum lines should lie outside the receiver frequency.

In one of the proposed embodiments of the receiving system its cooled elements (semiconductors, ferrites, magnets etc.) are disposed in such a place within the cryostat where the necessary temperature is constantly maintained provided by the temperature gradient of any cryostat.

Figure 5:
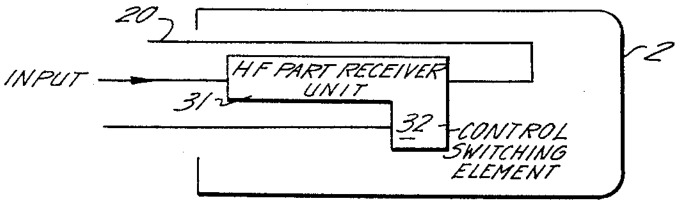
FIG. 5 shows a block diagram for connecting the cascades, employing cryotrons (cryosars), to the system.

To provide for the possibility of a compact electronic computing, programming or other device with memory cells in the receiving system, some of its units (FIG. 5) are made as a single block 31 within one cryostat 2 with control and switching elements 32 employing cryotrons (cryosars) or similar economical devices, operating at ultra-low temperatures.

Due to the fact that in the system the noise in the channels, following the quantum amplifiers are very small, the quantum amplifier designs provide for their operation at small amplifying levels (far from the generation threshold), thereby increasing the operation stability of the amplifiers by 4–5 times together with the operation of the input resonators, making it possible to obtain the bandwidth of some dozens of megacycles and thus realizing a construction of the system with a quantum amplifier of "a straight type" without a ferrite circulator at the amplifier input. More perfect characteristics may be obtained, if the quantum amplifier of the system is made in the form of several straight resonators with an active substance connected to each other directly or through sections of quarter wavelength lines. The resonators are a part of an ultra-high frequency input filter and the output of the amplifier is provided with a cooled ferrite valve 11 (FIG. 1).

Figure 6:
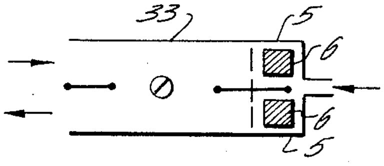
FIG. 6 shows a switch block diagram of the quantum amplifiers connection, operating "on reflection" with a slot bridge.

The wide band "reflecting" quantum amplifier of the system without an input ferrite circulator is a slot bridge 33 (FIG. 6). In both adjacent arms of bridge 33 resonators 5 are disposed which includes an active substance 6 (paramagnetic crystal) in a magnetic field. One of the arms of the slot bridge 33 is the input of the quantum amplifier, and the other is the output. The decoupling of the input and output arms is effected by the phase relationships in the slot bridge and its directivity. Pumping energy from pumping energy generator is applied to both amplifiers.

Figure 7:
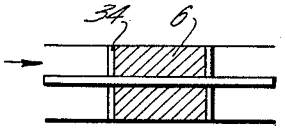
FIG. 7 shows a diagram of the inclusion of a paramagnetic substance in the coaxial line having a reactive discontinuity.

To achieve a 100 percent filling of the resonator, the active resonator of the quantum amplifier is a washer made of a paramagnetic crystal 6 (FIG. 7), disposed between reactive discontinuities 34 (for instance inductive rods) in the coaxial line, their thickness and number being chosen so as to provide the necessary quality of the resonator in accordance with the negative value of magnetic quality of the used paramagnetic crystal 6 (see FIG. 7).

Figure 8:
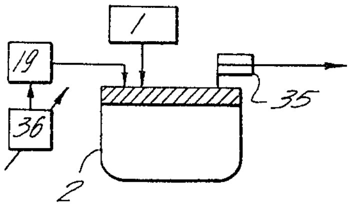
FIG. 8 shows a block diagram of the system for coupling a television set to its output via the I.F. (intermediate-frequency) channel of the system with a matching element.

To provide for the possibilty of using commercial television sets for direct reception of high-quality television signals from space (for instance from earth satellites in case of global communication, etc.) without employing costly and cumbersome additional radio-relay lines, instead of an intermediate frequency amplifier and all the output part of the system, the coaxial intermediate frequency output from the cryostat of the system (FIG. 8) is made as a coaxial cable with matching elements 35 coupled to a commercial television set (not shown), and the UHF (ultra-high frequency) heterodyner 19 of the receiving system is provided with an element 36 for retuning. The frequency is chosen so that the IF (intermediate-frequency) of the system coincides with the frequency of one of the channels of the television signal of the receiver when receiving a UHF (ultra-high frequency) signal.

To reduce the cost of the system, simplify it for various purposes, and provide for the possibility of using the same devices for various operations by adding and eliminating of separate parts and units, the receiving system (FIG. 1) is made in the form of a single line with plugs between separate functional blocks (parametric amplifiers, mixers, etc.), and with removable superconductive electro magnets and paramagnetic crystals of the quantum amplifiers so that it is readily possible to change the blocks and add or remove separate devices.

Figure 9:
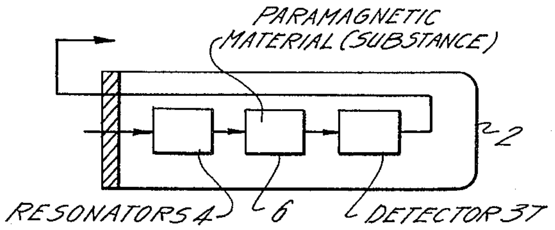
FIG. 9 shows a block diagram of the system for reception of FM (frequency-modulated) signals, operating according to the direct amplification principle (the direct amplification principle differs from superheterodyning by the lack of intermediate frequency conversion; for instance, a direct amplification receiver)

A sensitive UHF (ultra-high frequency) receiver with direct amplification which would be able to receive FM (frequency modulated) signals is shown in FIG. 9 comprising an input filter with a succession of resonators 4, a quantum paramagnetic substance 6 the composition and the medium frequency of which are chosen so that it converts, the FM signals into AM (amplitude modulated) oscillations, i.e., operates as a discriminator and a limiter due to the steep slopes of the spectral line, and a cooled detector 37 at the output of which there is a voltage, amplitude-modulated ultra-high frequency.

In order to increase the transmission bandwidth of the input part of the receiving system and to eliminate non-linear transient noises within the UHF (ultra-high frequency) channel without using a separate ferrite valve, between the last resonator of the input filter and the input resonator of the following low-noise stage (for instance, a parametric amplifier, or a mixer) a part of a line is provided with a delay line. The line is filled with a paramagnetic substance (traveling-wave quantum amplifier) whose magnetic field is created by an electromagnet with a superconductive winding.

To protect the semiconductor input devices (for instances, the parametric and mixing diodes) from burning out, from a powerful side frequency signal coming from the antenna, which in its turn leads to the formation of parasitic reception channels due to cross-modulation, and to provide an automatic selectivity control of the receiving system at various levels of the received useful signal at the input of any receiving system (including those without the quantum amplifier) a paramagnetic substance 6 (a crystal) is provided in the magnetic field (FIG. 10); the composition of the substance is chosen so that its saturation time is less than the burning out time of the diode in the following stage 38. The voltage from the output of the linear part 39 of the system is applied to the control element 40 in the pumping waveguide 7 of the quantum amplifier with substance 6, which blocks the pumping channel, if the input signal exceeds a predetermined level; the paramagnetic substance absorbs the powerful input signal.

To provide for the possibility of using, with any wavelength lines with better electrical characteristics, than those of waveguides, but with greater attenuation (for instance coaxial or strip lines) as well as for constructing miniature devices with small power consumption, the input, output and connecting lines of the system are made from superconductive material or from a material with a superconductive coating and their cross-sections are reduced to those critical for break-down, e.g. from coaxial lines with cross-sections less than one millimeter.

The superhigh sensitive selective UHF (ultra-high frequency) receiving system is made as a single cooled device within a cryostat at the temperature of liquid nitrogen (oxygen or neon) in which one of the resonators (for instance 41 on FIG. 1) is used for an ammonia molecular generator. The parts of the generator are in combination with the receiving system and the generator serves to stabilize the frequency of the heterodyner of the system.

Such a system has a heterodyner which (FIG. 11) is made as a cooled semiconductor generator 42 with the resonator 43 coupled to the heterodyne line of the system. The cooled stages of the frequency multiplier 44 employing parametric (or other) diodes are disposed therein to provide the required value of the heterodyne frequency with the stability of cooled quartz; or, to make the heterodyner, a resonator with a semiconductor (tunnel or avalanche type) diode; or a transistor quartz is used.

The construction of the system is characterized in that in the cryostat, at a temperature of liquid nitrogen (oxygen or neon) there is disposed a cooled active substance of ferrite material (ferrite parametric amplifier or limiter) having a small width of ferromagnetic line resonance at these temperatures. This substance is provided in one or several resonators of the multiresonator filter or similar device. The pumping channel of the cooled paramagnetic amplifier of the system is used as a pumping channel of the system and the ferrite material and the magnet are chosen so as to absorb the input signal in case it exceeds a definite level.

The superhigh sensitive receiving system of the invention is such a system in which the mixer (or amplifier) employing a tunnel diode is used as a UHF (ultra-high frequency) mixer (e.g. mixer 16) (or a similar stage). It is made as a single cooled construction with said system. These insulation films (for instance, with the thickness of 100–150°) with metal surfaces which, at a temperature of liquid helium have parts with negative resistance, can be used as a tunnel diode.

The superhigh sensitive receiving system is such a system, wherein the cooled parametric amplifier of which, for example, amplifier 12 of FIG. 1 is made as a circuit with auxiliary units; a washer made from seignette ceramic is disposed at the antinode of the electric field of the parametric amplifier; the pumping to the washer, which operates as a parametric diode, is effected in the usual manner from the pumping generator 8.

The receiving system of FIG. 12 is a system wherein the cryostat 2 is connected to the circuit of the closed cycle device comprising a compressor 45, a heat exchanger 46 and a nozzle 47 disposed on the shaft of one of the electric drives 48 of the system supply devices.

The installation diagram of the active element 49 of the low noise amplifiers (paramagnetic substance or ferrite semiconductor diode) in resonance diaphragm 50, positioned across the transmission line, is given in FIGS. 13 and 14 and requires no special explanations.

FIG. 15 shows the diagram of a receiving system for simultaneous reception on several signals with the use of low noise amplifiers at the input of the system, e.g., quantum amplifiers, operating in the "reflecting" mode. From FIG. 15 it is clear that such a system is achieved due to the use of only one ferrite circulator 51, any low-noise device with a wide passband, for instance the parametric amplifier 12 might be used as a subsequent stage connected to circulator 51.

In one of the embodiments of the receiving system a device of the traveling wave tube type is used as an amplifier with a low level of noise, disposed within the same cryostat and is connected to the following and in mixers 16 (FIGS. 1 and 2 of said system), use is made of diodes, the operating mode of which is properly selected for operation in the cryostat.

Though the present invention is described as it is in accordance with a preferred embodiment, it is understood that certain variations and modifications can be made without departing from the spirit and scope of the invention, as those skilled in the art will easily understand.

These variations and modifications (for instance using the parametric amplifier 12, not in a conversion mode as it is shown in FIGS. 1, 2, 3, 4, but in a "reflecting" mode with a circulator) will not go beyond the nature and scope of the invention as defined in the appended claims.

What is claimed is:

1. A super-high sensitive UHF selective radio receiving system, comprising passive resonators, directly interconnected in series, an input element connected to said series of passive resonators and adapted to receive an input signal; active resonators connected directly to said passive resonators and forming three groups, each including one of said active resonators; active elements arranged in said active resonators of the first group and forming low-noise amplifiers; magnetized ferrite elements located in said active resonators of the second group and forming ferrite devices which are connected to the inputs of said amplifiers; semi-conductor diodes located in the active resonators of the third group and forming mixers which include an input element for connection to the output of said amplifiers, an output element and coupling means; intermediate frequency amplifiers in the form of resonating elements including semi-conductor devices and an input connected to the output element of said mixer and an output element; a cryostat for accommodating said passive and active resonators forming said low-noise amplifiers, ferrite device and mixers, said intermediate frequency amplifiers, and for maintaining a cryogenic temperature; heterodyning means having an output element which is connected to the coupling means of said mixer and an input element; an automatic frequency tuning device located in said cryostat and connected to the input element of said heterodyning means; means for generating pumping energy including an output element for connection to said low-noise amplifiers; and elements for controlling and switching the system devices, said elements being connected to said devices.

2. A super-high sensitive UHF selective radio receiving system according to claim 1, wherein thin insulating films with a thickness ranging between 100–150 A., and having metallic surfaces, are the active elements of the low-noise amp ifiers, part of the characteristic of said films having negative resistance owing to the tunnel effect at ultra low temperatures.

3. A super-high sensitive UHF selective radio receiving system according to claim 1, wherein the elements controlling and switching the system elements include cryotrons or cryosars, and are structurally connected with said system in said cryostat.

4. A super-high sensitive UHF selective radio receiving system according to claim 1, wherein the active elements and the active elements therebetween are coated with metal which has superconductive properties at determinable temperature.

5. A super-high sensitive UHF selective radio receiving system according to claim 1, wherein the elements comprising the low-noise amplifiers include a paramagnetic material and a semi-conductor diode located in the active resonators of a multiresonator filter, the Q-factors of the loaded passive filter resonators being different.

6. A super-high sensitive UHF selective radio receiving system according to claim 1, wherein the heterodyning means is a transistorized generator including a quartz resonator and a frequency multiplier based on semiconductor diodes.

7. A super-high sensitive UHF selective radio receiving system according to claim 6, wherein the heterodyning means and the pumping generator include avalanche-type diodes arranged in the respective resonating elements.

8. A super-high sensitive UHF selective radio receiving system according to claim 6, wherein the heterodyning means includes an automatic frequency tuning device including a standard reference circuit constituted by a resonator coated with metal having superconductive properties at a determinable temperature.

9. A super-high sensitive UHF selective radio receiving system according to claim 1, wherein the low-noise amplifier includes a four-arm slot bridge, two arms of which comprise resonators with paramagnetic material and the others of which are adapted to receive input and output signals.

10. A super-high sensitive UHF selective radio receiving system according to claim 1, wherein the semiconductor pumping generator of the low-noise amplifier is located in the cryostat of said system and is connected to one of the pumping channels, the splitting and division of the pumping energy transmitted to said amplifiers being effected by means of a splitter located in the same cryostat.

11. A super-high sensitive UHF selective radio receiving system according to claim 1, wherein the active and passive resonators are arranged in tubes the number of which corresponds to the number of the reception waves of said system, each of said tubes including a central conductor, the active and passive resonators in each tube being tuned respectively to all working reception waves and the system is provided with a splitter uniting all said tubes and having a common input for connection of the antenna emitter, in order to maintain the desired quality of the parameters of said system operating in various reception waves within the waveband range of said system, said splitter being located in the cryostat.

12. A super-high sensitive UHF selective radio receiving system according to claim 1, comprising, outside the cryostat, elements allowing the heterodyne frequency to be retuned when recepting frequency is changed in order to maintain the intermediate frequency unaltered, the system comprising a splitter connected with said tubes which accommodate amplifiers, said splitter including arms one of which arms is adapted for connection to the antenna and is located in the cryostat.

13. A super-high sensitive UHF selective radio receiving system according to claim 1, wherein the low-noise amplifiers are located in a coaxial tube, the inner conductor of which is used as a pumping waveguide for said amplifiers, pumping energy being supplied to the active elements of said amplifiers through the coupling elements provided between the inner conductor serving as the pumping waveguide and the inner space of the coaxial tube serving as the signal channel, the pumping generator being connected to the central conductor of the coaxial line by means of a line of length $\lambda/4$ shorted at the end and providing an open input into the central conductor through which pumping is effected, a partition being installed at a distance of $\lambda/4$ inside the central conductor of said tube outside the cryostat.

14. A super-high sensitive UHF selective radio receiving system according to claim 1, wherein the active resonator of the low-noise amplifier is a paramagnetic washer installed between reactive discontinuities in the coaxial line, the thickness and number of said discontinuities being such as to obtain a predetermined load Q-factor of said active resonator in accordance with the value of the negative magnetic Q-factor of the paramagnetic material used.

15. A super-high sensitive UHF selective radio receiving system according to claim 1, wherein the tuning frequency of the active resonator comprising paramagnetic material and installed after the passive resonators forming multi-resonator filters, is shifted with respect to the tuning frequency of said filters, and owing to the steepness of the spectral line of said paramagnetic material the received frequency modulated signal is transformed into an amplitude modulated signal, the semiconductor diode being a UHF detector diode and a pre-amplifier, both located in said cryostat.

16. A super-high sensitive UHF selective radio receiving system according to claim 1, wherein low-noise amplifiers are constituted by said active resonators, one of which comprises a ferrite with a narrow line of ferromagnetic resonance at a given temperature, said ferrite being subjected to the effect of the magnetic field and being used to absorb the input signal exceeding the preset level, the other resonator comprising a diode.

17. A super-high sensitive UHF selective radio receiving system according to claim 1, wherein the low-noise amplifier is an active resonator which comprises auxiliary elements and houses magnetoceramic material which functions as the active element of said amplifier.

18. A super-high sensitive UHF selective radio receiving system according to claim 1, wherein the active and passive resonators include resonating membranes having direct interconnection.

19. A super-high sensitive UHF selective radio receiving system according to claim 1, wherein the low-noise amplifiers are provided in accordance with the number of reception waves as sequential resonators, one of which houses active material, said resonators being respectively tuned to said reception waves, said system comprising: a splitter including arms to compensate for the shunting effect of said amplifiers on each other when they are connected in parallel to the input arm; a ferrite circulator, one arm of which is connected to said splitter with said amplifiers operating in the reflecting mode, and the other arm to the amplifiers based on semiconductor diodes, one of said arms being used as the input for said system as a whole.

20. A super-high sensitive UHF selective radio receiving system according to claim 5, wherein the paramagnetic material of the quantum amplifier has a saturation time less than the burning time of said semiconductor diode located after said amplifier, the voltage from the output of the linear part of said receiving system being supplied to the control element in the pumping waveguide of the quantum amplifier, said control element closing the pumping channel when the input signal exceeds a given level, the paramagnetic material absorbing a heavy input signal.

References Cited

UNITED STATES PATENTS

| | | | |
|---|---|---|---|
| Re. 25,317 | 1/1963 | McCoy | 317—101 |
| 2,929,922 | 3/1960 | Schawlow et al. | 330—5 |
| 2,997,582 | 8/1961 | Silvey | 325—445 |
| 3,092,782 | 6/1963 | Chang | 330—53 |
| 3,169,227 | 2/1965 | Closson | 325—445 |
| 3,217,259 | 11/1965 | Kotzebue et al. | 325—445 |

OTHER REFERENCES

Foster: Abstract of Application, Ser. No. 678,171, published June 30, 1953, p. 1496.

Allin: P.E.V. Ferrites at Microwaves. Electronic Engineering, June 1957, pp. 292–296.

Nergaard, L. S.: Non-linear Capacitance Amplifiers Scic. Lib. RCA Review, March 30, 1959, pp. 3–17.

Murkami, Tomomi: Parametric Tuning Systems Useful for Radar and Television Receivers. RCA Technical Notes; September 1961, pp. 1–3.

KATHLEEN H. CLAFFY, *Primary Examiner.*

A. H. GESS, *Assistant Examiner.*